United States Patent [19]

Honsberg et al.

[11] 4,154,707

[45] May 15, 1979

[54] PROCESS FOR ELASTOMER VISCOSITY STABILIZATION

[75] Inventors: Wolfgang Honsberg, Wilmington; Tsuneichi Takeshita, Newark, both of Del.

[73] Assignee: E. I. Du Pont de Nemours and Company, Wilmington, Del.

[21] Appl. No.: 899,296

[22] Filed: Apr. 24, 1978

[51] Int. Cl.$^2$ .................... C08K 5/20; C08K 5/11; C08K 5/07

[52] U.S. Cl. .................... 260/3.5; 260/45.7 R; 260/45.85 V; 260/45.8 N; 260/45.9 NC; 260/782; 260/784; 260/800; 260/810

[58] Field of Search .............. 260/711, 782, 784, 800, 260/810, 45.9 NC, 45.8 NB, 45.85 V, 45.7 R, 3.5; 526/295

[56] References Cited

U.S. PATENT DOCUMENTS

| | | | |
|---|---|---|---|
| 2,313,757 | 3/1943 | Matheson et al. | 260/45.85 V |
| 2,392,756 | 1/1946 | Mighton | 526/295 |
| 2,885,319 | 5/1959 | Ligett et al. | 260/45.85 A |
| 3,153,014 | 10/1964 | Fletcher et al. | 260/784 |
| 3,240,750 | 3/1966 | Bonvicini | 260/45.85 V |
| 3,506,624 | 4/1970 | Behrens | 260/78.4 |

*Primary Examiner*—V. P. Hoke

[57] ABSTRACT

The viscosity of chloroprene polymers is stabilized by addition to the polymer of 0.1–5 weight % of an ester, amide, or amic acid derived from maleic acid or fumaric acid or a diacylethylene compound or from their halogenated derivatives. Stabilization of chloroprene polymers made in the absence of elemental sulfur allows them to be mixed under high temperature/high shear conditions, without undergoing substantial crosslinking for practical periods. Sulfur-modified chloroprene polymers are stabilized against viscosity increases during ambient temperature aging. Blends of either type of chloroprene polymers with hydrocarbon diene elastomers can be similarly stabilized.

15 Claims, No Drawings

PROCESS FOR ELASTOMER VISCOSITY STABILIZATION

BACKGROUND OF THE INVENTION

This invention relates to a process for stabilizing the viscosity of chloroprene polymers and polymer blends.

Chloroprene polymers suitable in the process of this invention are homopolymers of chloroprene and copolymers of chloroprene with ethylenically unsaturated organic monomers, including copolymers of chloroprene with sulfur, the so-called sulfur-modified chloroprene polymers. Chloroprene polymers are often compounded at elevated temperatures, of the order of 100°–120° C. or higher, in mixing or blending equipment such as internal mixers or rubber mills, frequently under high shear conditions. Mastication or shearing at elevated temperatures generates free radicals, which are capable of attacking the polymer backbone and causing crosslinking of the polymer. Sulfur-modified polymers often increase in viscosity during ambient temperature aging. These changes are, of course, undesirable because they result in loss of processability and also in deterioration of physical properties of the vulcanized elastomer.

SUMMARY OF THE INVENTION

There is now provided a process for stabilizing the viscosity of chloroprene homopolymers and copolymers with ethylenically unsaturated monomers and of sulfur-modified chloroprene polymers, the proportion of ethylenically unsaturated monomers in the copolymer being at most about 20 weight %, and the proportion of elemental sulfur in the polymerization recipe being at most about 3.0 weight %, as well as blends of such chloroprene homopolymers and copolymers with hydrocarbon diene elastomers, wherein the proportion of the hydrocarbon diene elastomer is at most about 70 weight %;

said process comprising incorporating into the chloroprene polymer or polymer blend about 0.1–5 parts per 100 parts by weight of the chloroprene polymer of a vinylenedicarbonyl compound represented by the following Formula (1)

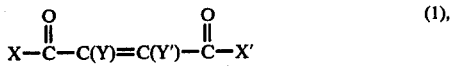

wherein the following relationships exist:
(1) each of X and X' independently is —OR; —NR$^1$R$^2$; or —R$^3$,
  where R is a C$_1$–C$_{12}$ alkyl, or a C$_6$–C$_{15}$ aryl, aralkyl or alkaryl;
  each of R$^1$ and R$^2$ independently is H, a C$_1$–C$_{12}$ alkyl, or a C$_6$–C$_{15}$ aryl, aralkyl or alkaryl; and R$^3$ is a C$_6$–C$_{15}$ aryl or alkaryl; or
(2) X=—OH and X'=—NHR$^4$, where R$^4$ is a C$_1$–C$_{12}$ alkyl; or
(3) X and X', taken together, form the —N(R$^5$)— group, where R$^5$ is a C$_1$–C$_{18}$ alkyl, or a C$_6$–C$_{15}$ aryl, aralkyl or alkaryl; and
(4) each of Y and Y' independently is hydrogen or chlorine.

DETAILED DESCRIPTION OF THE INVENTION

The problem of undesirable crosslinking of chloroprene polymers made in the absence of elemental sulfur and blends of such polymers, during mixing or milling occurs only at high temperature, above about 100° C., and under high shear conditions. Since various types of blending equipment can be used, the exact temperature ranges or shear conditions which promote free radical formation and thus crosslinking cannot be stated precisely. An engineer or chemist familiar with chloroprene polymer blending operations will have no difficulty recognizing such conditions. However, a widely used laboratory piece of equipment, the Brabender Plasti-Corder ® is normally operated at 100°–180° C. and 40–150 r.p.m. Under those conditions, crosslinking is observed in the absence of a viscosity stabilizer. Similarly, temperature and r.p.m. ranges can be readily established for commercial mixers, rubber mills, and other equipment.

Sulfur-modified chloroprene polymers often increase in viscosity on prolonged storage at ambient temperature, for example, up to about 40° C. While it is desirable for a sulfur-modified chloroprene polymer to maintain its viscosity for up to about 24 months, accelerated aging tests, carried out at elevated temperatures for shorter periods, are useful for predicting the polymer viscosity changes during long storage period.

The vinylenedicarbonyl compounds of Formula (1) are esters, amides, and amic acids derived from maleic and fumaric acids and diacylethylene compounds or from mono- or dihalo derivatives of these compounds. The stereochemistry about the double bond —C(Y)=C(Y')— can be either cis or trans. All these chemical compounds are well known or can be prepared by well known methods. See, for example, Volumes I–IV of "Reagents for Organic Synthesis" by L. F. and M. Fieser, John Wiley & Sons, Inc., New York, 1967.

Typical vinylenedicarbonyl compounds within the scope of this invention are the following: N-methyl-, N-ethyl-, N-propyl-, N-isopropyl-, N-n-butyl-, N-isobutyl-, N-t-butyl-, N-n-pentyl-, N-isopentyl-, N-t-pentyl-, N-3-methylbutyl-, N-n-hexyl-, N-n-heptyl-, N-n-octyl-, N-n-nonyl-, N-benzyl, N-n-decyl-, N-undecyl-, N-dodecyl-, N-octadecyl-, N-phenyl-, N-3,5-dimethylphenyl-, and N- -naphthylmaleimides; methyl N-methylmaleamate, methyl N-ethylmaleamate, methyl N-propylmaleamate, methyl N-n-butylmaleamate, methyl N-n-pentylmaleamate, methyl N-n-hexylmaleamate, methyl N-heptylmaleamate, methyl N-octylmaleamate, N-benzyl methyl N-dodecylmaleamate, ethyl N-methylmaleamate, ethyl N-ethylmaleamate, and ethyl N-propylmaleamate; dimethyl, diethyl, di-n-propyl, di-isopropyl, di-n-butyl, di-isobutyl, di-n-pentyl, di-n-hexyl, di-n-heptyl, di-n-octyl, di-2-ethylhexyl and dibenzyl fumarates and maleates; N-methylmaleamic acid; and 1,2-dibenzoylethylene, 1,2-di(methylbenzoyl)ethylene, 1,2-di(-dimethylbenzoyl)ethylene, and 1,2-dinaphthoylethylene; as well as the corresponding derivatives of 2-chloro- and 2,3-dichloro maleic and fumaric acids; and of chloro-, dichloro-, and diaroyl- ethylene. The most effective vinylenedicarbonyl compounds are dibenzoyl ethylene, maleimides, N-phenylmaleimide being particularly preferred; while maleic and fumaric acid diesters are the most economical, dibutyl fumarate being the most suitable.

The preferred concentration of the stabilizing compound is 0.5–2 parts per 100 parts by weight of chloroprene polymer since within this range adequate protection is provided at moderate cost.

Hydrocarbon diene elastomers which may be blended with chloroprene polymers, the resulting blends also being stabilized according to the process of this invention, include, for example, styrene/butadiene copolymers, polybutadiene, natural rubber, polyisoprene, isoprene/butadiene copolymers, and the like.

The vinylenedicarbonyl compounds of the present invention are incorporated into the chloroprene polymer or polymer blends at any convenient stage prior to the additon of curing agents.

In the case of chloroprene polymers made in the absence of elemental sulfur, the vinylenedicarbonyl compounds may be added (a) to the chloroprene polymer while it is in the latex form, (b) to the isolated gum chloroprene polymer, or (c) to blends of chloroprene polymers and plasticizers and/or fillers (clay, carbon black, etc.). In the case of sulfur-modified chloroprene polymers, the vinylenedicarbonyl compounds are added either to the latex or to the freshly isolated gum polymer.

The vinylenedicarbonyl compound must not interfere with subsequent vulcanization. In the industrial practice, chloroprene elastomers are compounded by first blending them with all the ingredients other than curing (vulcanizing) agents, then adding the curing agents. The purpose of this invention is to protect the elastomer being compounded from crosslinking in the absence of curing agents, but not to prevent vulcanization in their presence.

The effectiveness of these vinylenedicarbonyl compounds in polymers made in the absence of elemental sulfur is best determined in an apparatus which measures torque of unvulcanized compounds as a function of time and temperature. A Brabender Plasti-Corder ® can be used, for example. Normally, the torque decreases at first, after a preheat period, because of further softening of the sample as it reaches the test temperature and the beginning of degradation. As crosslinking occurs, the torque tends to increase, so that the torque vs. time relationship can be graphically represented as approximately an inverted bell-shaped curve, which has a minimum. The lower the value of the minimum the softer and better processable is the polymer. It is desirable that the onset of torque increase be delayed as much as possible so that adequate time is available for performing the mixing operation or any other operation that can cause cross-linking.

A convenient measure of good workability of chloroprene polymer is an increase of torque not exceeding about 1.96 N·m above an acceptable minimum value. Thus, one would desire a slow decrease to minimum torque, a low minimum torque, and a slow rise to a value of 1.96 N·m above the minimum. The process of the present invention satisfies these requirements.

For determining changes in viscosity of sulfur-modified chloroprene polymers in accelerated aging tests, the most convenient measurement is that of Mooney viscosity, according to ASTM method D-1646.

This invention is now illustrated by the following examples of certain preferred embodiments thereof, wherein all parts, proportions, and percentages are by weight unless otherwise indicated.

Polymer Preparation

The polymers used in the examples were prepared using the emulsion recipes given in Table I. Polymerization to the indicated conversions was carried out in alkaline solution by the stepwise addition of an aqueous catalyst containing potassium persulfate and sodium 2-anthraquinone sulfonate. The polymerizations were short-stopped by the addition of the short-stop or peptization recipes given in Table I, which were fed as toluene emulsions stabilized with "Lomar" PW and sodium lauryl sulfate. Peptization recipes used in the preparation of Polymers 2-4 also contained 4,4'-thiobis-6-tert-butyl-o-cresol. The short-stopped emulsions were cooled to 20°-25° C. before further processing. Polymers B-D were aged for two to three hours to effect peptization; then, solvents and unchanged monomer were stripped, and the polymers were further aged 18-26 hours after stripping. Polymer A simply was short-stopped, stripped, and aged. Stripping was carried out by the process of U.S. Pat. No. 2,467,679. The aged polymers were acidified with an acetic acid solution, isolated by the freeze roll process of U.S. Pat. No. 2,187,146, and then washed and dried.

TABLE I

| EMULSION RECIPES (parts) | | | | | |
|---|---|---|---|---|---|
| Polymer | A | B | C | D | E |
| Chloroprene | 100 | 100 | 100 | 100 | 100 |
| Nancy Wood Rosin[a] | — | 4.0 | 4.0 | 4.0 | 4.0 |
| Resin 90[b] | 2.85 | — | — | — | — |
| Dodecyl Mercaptan | 0.23 | — | — | — | — |
| t-Hexadecylmercaptan | — | — | — | — | 0.7 |
| Water | 86 | 114 | 114 | 114 | 100 |
| "Lomar" PW Emulsifier[c] | 0.4 | 0.6 | 0.56 | 0.6 | 0.7 |
| Sulfur[d] | — | 0.6 | 0.56 | 0.6 | 2.3 |
| CU [+2] ion (ppm) | — | 0.4 | 40 | 0.4 | — |
| Temp. (°C.) | 40 | 40 | 45 | 40 | 48 |
| Conversion (%) | 67 | 88 | 69 | 88 | 83 |

| SHORTSTOP OR PEPTIZATION RECIPES | | | | | |
|---|---|---|---|---|---|
| Polymer | A | B | C | D | E |
| Tetramethyl thiuram disulfide | — | 0.4 | 1.1 | 0.37 | — |
| "Tepidone" N[e] | — | 0.73 | 0.94 | 0.6 | — |
| Phenothiazine | 0.014 | — | 0.4 | — | 0.014 |
| p-tert-butyl catechol | 0.016 | — | — | — | 0.016 |
| Phenyl 2-naphthyl-amine | — | 0.136 | — | — | — |

[a]Mixture of rosin acids high in conjugated dienes (Tenneco Chemicals, Inc.)
[b]Disproportionated tall oil rosin (Westvaco CO.)
[c]Sodium salt of formaldehyde-naphthalenesulfonic acid condensate (Nopco Chemical Co.)
[d]Sulfur was added as a solution in chloroprene in recipes B-D and as a combination of solution in chloroprene and water dispersion in recipe E.
[e]47% Sodium dibutyl dithiocarbamate in water (E. I. du Pont de Nemours & Co.).

EXAMPLE 1

The samples used in the Brabender Plasti-Corder ® evaluation described below were prepared by mill-mixing 100 parts of polychloroprene (Polymer A) with the indicated stabilizer for 6 minutes at 40° C. Replicate samples, including controls, were made under these conditions. The samples were evaluated using C. C. McCabe's method, described in "Rheological Measurements with the Brabender Plastograph", Transactions of the Society of Rheology IV, pp. 335-346 (1960). The Brabender Plastograph ® was an earlier version of the instrument presently known as the Brabender Plasti-Corder ®. It is an instrument which subjects a polymer to shear forces and measures torque with time, as a function of shear rate and temperature. The mixing rate and the jacket temperature were fixed at 63 r.p.m. and 171° C., respectively. The ram gate was in the down position and the air inlet closed. The graphic results were converted to the following numerical data: minimum torque (newton·meters), minimum torque time (i.e., time to minimum torque) and time to 1.96 newton-meter rise above meter torque from time 0.

The stabilizers are listed in Table II, and the results are given in Table III, below.

TABLE II

| Additive No. | Chemical Name |
|---|---|
| I | N-phenylmaleimide |
| II | N-ethylmaleimide |
| III | N-octadecylmaleimide |
| IV | N-phenylchloromaleimide |
| V | N-phenyldichloromaleimide |
| VI | N-methylmaleamic acid |
| VII | methyl N-dodecylmaleamate |
| VIII | diethyl maleate |
| IX | diethyl fumarate |
| X | dibutyl fumarate |
| XI | trans-1,2-dibenzoylethylene |

TABLE III

| Run No. | Additive (parts) | Minimum Torque (N . m) | Minimum Torque Time (min.) | Time to 1.96 N . m Rise above minimum (min.) |
|---|---|---|---|---|
| 1 | None | 11.5 | 5.0 | 11.3 |
|   | I (0.1) | 11.6 | 6.5 | 14.5 |
|   | (0.25) | 9.9 | 9.0 | >15 |
|   | (0.5) | <10.6 | >15 | >>15 |
| 2 | None | 11.7 | 3.5 | 7.5 |
|   | I (1) | 8.4 | >15 | >>15 |
| 3 | None | 11.2 | 4.0 | 10.0 |
|   | II (1) | 11.0 | 7.4 | >15 |
| 4 | None | 11.3 | 6.5 | 12.5 |
|   | III (1) | 10.5 | 8 | >15 |
| 5 | None | 11.0 | 4.7 | 11.2 |
|   | IV (1) | <9.4 | >15 | >>15 |
| 6 | None[a] | 11.2 | 4.0 | 10.0 |
|   | V (1) | 9.9 | 7.3 | >15 |
| 7 | None[a] | 11.2 | 4.0 | 10.0 |
|   | VI (1)[d] | 10.8 | 2.5 | >15 |
|   |  | 11.6 | 9.2 | >15 |
| 8 | None[b] | 11.3 | 6.5 | 12.5 |
|   | VII (1) | 10.7 | 8.5 | >15 |
| 9 | None | 11.5 | 5.8 | 14.2 |
|   | VIII (1) | 10.8 | 6.3 | >15 |
| 10 | None[c] | 11.5 | 5.8 | 14.2 |
|   | IX (1) | 10.6 | 8.3 | >15 |
| 11 | None[c] | 11.5 | 5.8 | 14.2 |
|   | X (1) | 10.5 | 8.5 | >15 |
| 12 | None | 11.7 | 4.4 | 11.9 |
|   | XI (1) | ~9.7 | ≧15 | >>15 |

[a]Same control as No. 3
[b]Same control as No. 4
[c]Same control as No. 9
[d]Two minima observed.

EXAMPLE 2

As shown in Table IV, sulfur-modified chloroprene Polymers B-D were mill-mixed with the stabilizers (from Table I) and aged at an elevated temperature.

TABLE IV

| Run No. | Polymer | Additive (phr)[a] | Accelerated Aging Temp. | Accelerated Aging Time | Δ Mooney Viscosity[b] | Unstabilized Control Δ Mooney Viscosity[b] |
|---|---|---|---|---|---|---|
| 1 | B | I (1) | 50° C. | 2 weeks | 0 | +7 |
|   |   |   |   | 3 | +5 | +10 |
|   |   |   |   | 5 | +8 | +14 |
| 2 | B | XI (1) | 70 | 1 | +4 | +7 |
|   |   |   |   | 2 | +8 | +16 |
| 3 | C | I (1) | 38 | 2 | −3 | 0 |
|   |   |   |   | 3 | +2 | +4 |
|   |   |   |   | 5 | +3 | +7 |
|   |   |   |   | 8 | +1 | +14 |
| 4 | C | XI (1) | 38 | 4 | −1 | +8 |
|   |   |   |   | 8 | 0 | +12 |
| 5 | C | X (1) | 38 | 2 | −1 | 0 |
|   |   |   |   | 3 | +6 | +4 |
|   |   |   |   | 5 | +6 | +7 |
|   |   |   |   | 8 | +7 | +14 |
| 6 | C | X (2) | 38 | 4 | +4 | +8 |
|   |   |   |   | 8 | +6 | +12 |
| 7 | D | I (1) | 70 | 1 | −3 | −4 |
|   |   |   |   | 2 | −3 | +15 |
|   |   |   |   | 3 | −2 | +7 |
| 8 | E | XI (2) | 38 | 2 | +1 | +14 |
|   |   |   |   | 4 | +2 | +11 |
|   |   |   |   | 6 | −1 | +7 |

[a]Parts per 100 parts of polymer.
[b]Change in Mooney viscosity, ML 2.5 (100° C.), at the end of the indicated test period.

The above data indicate that sulfur-modified chloroprene polymers stabilized according to the processs of this invention tend to increase their viscosity in accelerated aging tests to a lesser degree than the unstabilized, control samples of the same polymers.

We claim:

1. A process for stabilizing in the absence of vulcanizing agents the viscosity of chloroprene homopolymers and copolymers with ethylenically unsaturated monomers and of sulfur-modified chloroprene polymers, the proportion of ethylenically unsaturated monomers in the copolymer being at most about 20 weight %, and the proportion of elemental sulfur in the polymerization recipe being at most about 3.0 weight %, as well as blends of such chloroprene homopolymers and copolymers with hydrocarbon diene elastomers, wherein the proportion of the hydrocarbon diene elastomer is at most about 70 weight %;

said process comprising incorporating into the chloroprene polymer or polymer blend about 0.1–5 parts per 100 parts by weight of the chloroprene polymer of a vinylenedicarbonyl compound represented by the following Formula (1)

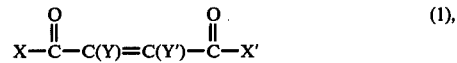

wherein the following relationships exist:

(1) each of X and X' independently is —OR; —NR$^1$R$^2$; or —R$^3$,
where R is a C$_1$–C$_{12}$ alkyl, or a C$_6$–C$_{15}$ aryl, aralkyl or alkaryl;
each of R$^1$ and R$^2$ independently is H, a C$_1$–C$_{12}$ alkyl, or a C$_6$–C$_{15}$ aryl, aralkyl or alkaryl; and
R$^3$ is a C$_6$–C$_{15}$ aryl or alkaryl; or (2) X=—OH and X'=—NHR$^4$, where R$^4$ is a C$_1$–C$_{12}$ alkyl; or (3) X and X', taken together, form the —N(R$^5$)— group, where R$^5$ is a C$_1$–C$_{18}$ alkyl, or a C$_6$–C$_{15}$ aryl, aralkyl or alkaryl; and (4) each of Y and Y' independently is hydrogen or a halogen.

2. A process of claim 1 wherein the chloroprene polymer is made in the absence of elemental sulfur and is stabilized against viscosity increase at a temperature above about 100° C. and under high shear conditions.

3. A process of claim 2 wherein the chloroprene polymer is polychloroprene.

4. A process of claim 1 wherein the chloroprene polymer is sulfur-modified and is stabilized against viscosity increase on prolonged storage at ambient temperature.

5. A process of claim 4 wherein the sulfur-modified chloroprene polymer is a chloroprene-sulfur copolymer.

6. A process of claim 1 wherein the concentration of the vinylenedicarbonyl compound is 0.5–2 parts per 100 parts by weight of the chloroprene polymer.

7. A process of claim 6 wherein the vinylenedicarbonyl compound is a maleimide or fumaric acid diester.

8. The process of claim 7 wherein the vinylenedicarbonyl compound is N-phenylmaleimide or dibutyl fumarate.

9. An unvulcanized polymer composition containing no vulcanizing agent and consisting essentially of a chloroprene homopolymer or a copolymer of chloroprene with an ethylenically unsaturated monomer or a sulfur-modified chloroprene polymer, the proportion of ethylenically unsaturated monomers in the copolymer being at most about 20 weight %, and the proportion of elemental sulfur in the polymerization recipe being at most about 3.0 weight %, or a blend of such chloroprene polymer with a hydrocarbon diene elastomer, the proportion of the hydrocarbon diene elastomer being at most 70 weight %, and about 0.1–5 parts 100 parts by weight of the chloroprene polymer of a vinylenedicarbonyl compound represented by the following formula

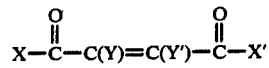

wherein the following relationships exist:
(1) each of X and X' independently is —OR; —NR$^1$R$^2$; or —R$^3$,
where R is a C$_1$–C$_{12}$ alkyl, or a C$_6$–C$_{15}$ aryl, aralkyl or alkaryl;
each of R$^1$ and R$^2$ independently is H, a C$_1$–C$_{12}$ alkyl, or a C$_6$–C$_{15}$ aryl, aralkyl or alkaryl; and
R$^3$ is a C$_6$–C$_{15}$ aryl or alkaryl; or
(2) X=—OH and X'=—NHR$^4$, where R$^4$ is a C$_1$–C$_{12}$ alkyl; or
(3) X and X', taken together, form the —N(R$^5$)— group, where R$^5$ is a C$_1$–C$_{18}$ alkyl, or a C$_6$–C$_{15}$ aryl, aralkyl or alkaryl; and
(4) each of Y and Y' independently is hydrogen or chlorine.

10. A composition of claim 9 wherein the chloroprene polymer is polychloroprene.

11. A composition of claim 9 wherein the chloroprene polymer is a chloroprene-sulfur copolymer.

12. A composition of claim 9 wherein the vinylenedicarbonyl compound is a maleimide or a diester of fumaric acid.

13. A composition of claim 12 wherein the vinylenedicarbonyl compound is N-phenylmaleimide or dibutyl fumarate.

14. A composition of claim 9 wherein the hydrocarbon elastomer is a styrene/butadiene copolymer, polybutadiene, natural rubber, polyisoprene, or an isoprene/butadiene copolymer.

15. A composition of claim 9 wherein the proportion of the vinylenedicarbonyl compound is 0.5–2 parts per 100 parts by weight of the chloroprene polymer.

* * * * *

UNITED STATES PATENT OFFICE
CERTIFICATE OF CORRECTION

PATENT NO. : 4,154,707
DATED : May 15, 1979
INVENTOR(S) : Honsberg et al.

It is certified that error appears in the above-identified patent and that said Letters Patent are hereby corrected as shown below:

Claim 9, column 7, line 35, after 0.1-5 parts insert --per--

Signed and Sealed this

Twenty-eighth Day of August 1979

[SEAL]

Attest:

*Attesting Officer*

LUTRELLE F. PARKER
*Acting Commissioner of Patents and Trademarks*